United States Patent [19]

Lessman

[11] 3,927,254

[45] Dec. 16, 1975

[54] OPTICAL SEEKER SCANNING SYSTEM

[75] Inventor: Gerhard Lessman, Chino, Calif.

[73] Assignee: General Dynamics Corporation, Pomona, Calif.

[22] Filed: Mar. 13, 1975

[21] Appl. No.: 558,093

[52] U.S. Cl. ............. 178/7.1; 178/7.6; 178/DIG. 8; 244/3.16; 350/1

[51] Int. Cl.²... H04N 3/16; H04N 3/00; F41G 7/00; G02B 5/20

[58] Field of Search................. 178/DIG. 8, 7.1, 7.6; 350/6, 7, 55, 1; 250/333, 334; 244/3.16; 102/70.2 P

[56] References Cited

UNITED STATES PATENTS

| | | | |
|---|---|---|---|
| 3,239,674 | 3/1966 | Aroyan | 244/3.16 |
| 3,790,256 | 2/1974 | Mecklenborg | 350/51 |
| 3,793,958 | 2/1974 | Holt et al. | 244/3.16 |

*Primary Examiner*—George H. Libman
*Assistant Examiner*—R. John Godfrey
*Attorney, Agent, or Firm*—Neil F. Martin; Edward B. Johnson

[57] ABSTRACT

A lens system directs an incident ray bundle to imaging means that is arranged about a system optical axis. The ray bundle is first intercepted by dihedral reflector means which rotates the ray bundle at an angular rate twice its own and a trihedral reflector means that intercepts the rotated ray bundle and proceeds to invert and revert that ray bundle. Dichroic filters are associated with each of the dihedral or trihedral reflector means and are effective to disassociate the ray bundle into the infrared and visible wavelengths. Only the infrared wavelengths are permitted to pass through the filters for reflection to an infrared detector disposed between the dihedral and trihedral reflector means. The filter associated with the dihedral reflector means includes a zone of transparency which permits visible wavelengths to pass therethrough and be focused on a video detector disposed on the optical axis behind the dihedral reflector means.

8 Claims, 2 Drawing Figures

OPTICAL SEEKER SCANNING SYSTEM

BACKGROUND OF THE INVENTION

The present invention relates to an optical seeker system which includes an image forming optical system, and scanning means which sweep the image plane over a detector in a systematic scanning pattern.

The image forming system in optical seeker systems is often of the well-known Cassegrainian type, and scanning is accomplished by slightly tilting primary and secondary reflectors while rotating them at different speeds. This results in a scanning motion of the image plane over a detector in a rosette pattern, similar to certain so-called Lissajou patterns. A defect of this arrangement is that the image plane is tilted at a compound angle corresponding to the tilt and angular position of the rotating reflectors. If a comparatively wide field of view is desired, or if a comparatively high resolution over a more narrow field of view is desired, then the off-axis image is tilted out of the detector plane and is imaged upon the detector out of focus. Similar problems exist with refractive or other optical scanning systems. The instant invention can be applied to such systems to eliminate the resolution problem, due to image tilt.

Another problem associated with scanning optical systems arises from the need to operate at two widely different wavelengths, it being necessary that the scanning function be operative over only one wavelength channel but not the other. For example, there are optical seeker systems which gather both infrared and visual information to be presented to an infrared detector and video detector respectively. The infrared image must be scanned over the infared detector for signal processing puproses, whereas the visual image should be stationery upon a video detector. The instant invention is effective to perform this function as well as to eliminate the tilt associated with many prior art scanning systems.

SUMMARY OF THE INVENTION

A primary object of the instant invention is the provision of a seeker system which generates a rosette scanning motion in a simple efficient manner.

Another object of the instant invention is provision of an optical seeker system which generates an image scanning motion which is purely translatory.

A further object of the instant invention is the provision of a new and improved seeker system which is adaptable for use where a comparatively wide field of view is desired.

A further object of the instant invention is the provision of a seeker system which produces high resolution images.

Still another object of the instant invention is the provision of a seeker system which generates a rosette scanning motion over only one wavelength channel.

Another object of the instant invention is provision of an optical seeker system which effectively operates at two widely different wavelengths.

In accordance with the above designs, the seeker system of the instant invention comprises an image forming optical system of the Cassegrainian type which generally consists of a primary and secondary mirror in a folded beam configuration. Other optical elements or lenses may also be present to assist in the image correction process. The optical system is additionally folded by dihedral and trihedral reflector means which affect the system spacings and path lengths in a manner similar to plane mirrors placed at their respective vertices. The reflectors are mounted for rotation about their principal axes and they are driven by electric motors at appropriate speeds to generate a rosette scanning function.

The dihedral reflector, consisting of two plane mirrors at an angle of precisely 90° to each other, has the well-known property of rotating the image space at an angular rate twice its own. The trihedral reflector consists of three mutually orthogonal reflectors intersecting upon the optical axis in a configuration of a cube corner. This configuration has the well-known properties of acting as a retro reflector, inverting and reverting an image but not rotating it. If, however, the axis of the trihedral is slightly offset from the optical axis, then the rotation of the trihedral about the optical axis causes the image space to be translated in a circle about the optical axis, the circle having a radius equal to the offset. The dihedral and trihedral reflectors may also be implemented as solid configurations with flat front faces, suitable for the application of dichroic reflector films.

The combination of the rotating dihedral reflector with a rotating offset trihedral reflect or leads to the desired rosette scanning function with the important advantage that both components of the rosette scanning motion are pure translation, in the image plane. No tilting of the image plane takes place.

Separation of widely separated spectral components is accomplished by means of beam splitters which are utilized to avoid the scanning action at visual wavelengths, as well as to change the spacing and path length of the system. The beam splitters are designed to permit the infrared radiation to pass therethrough and traverse the system components such that the infrared image will fall on an infrared detector that is situated between the dihedral and trihedral reflectors. The visible radiation is not permitted to pass through the beam splitters but is reflected by them and its folded beam reflected path is shortened such that the visible image falls on a vidicon detector situated behind the dihedral reflector. The beam splitters function to short-circuit the effect of the rotating mirrors so that a stationery image of the visual channel is formed on the vidicon tube. The configuration of nested reflective components functions without substantial vignetting because the central obscuration of the primary, traced back to the two different image planes allows the placement of the components in mutually noninterfering locations.

The above and other aspects of the instant invention will be apparent as the description continues and when read in conjunction with the appended drawings.

DETAILED DESCRIPTION OF THE DRAWINGS

Figure 1:
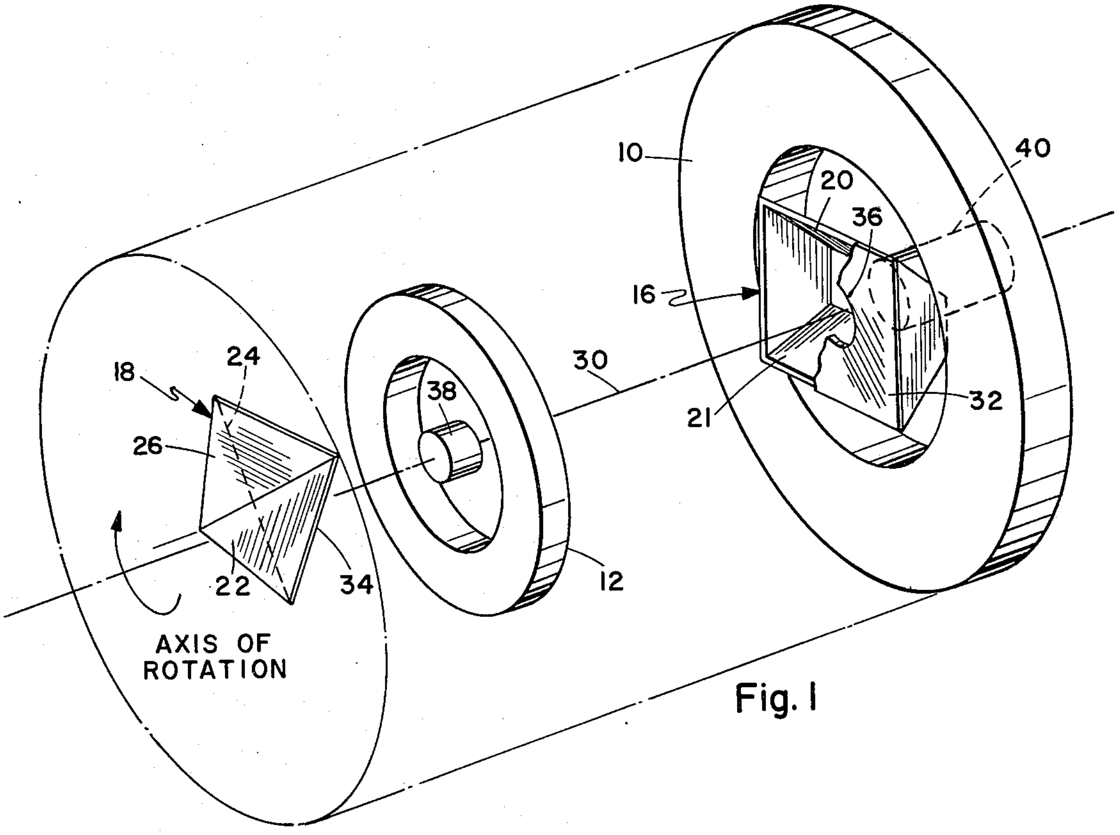
FIG. 1 illustrates the basic components of the optical system.
Figure 2:
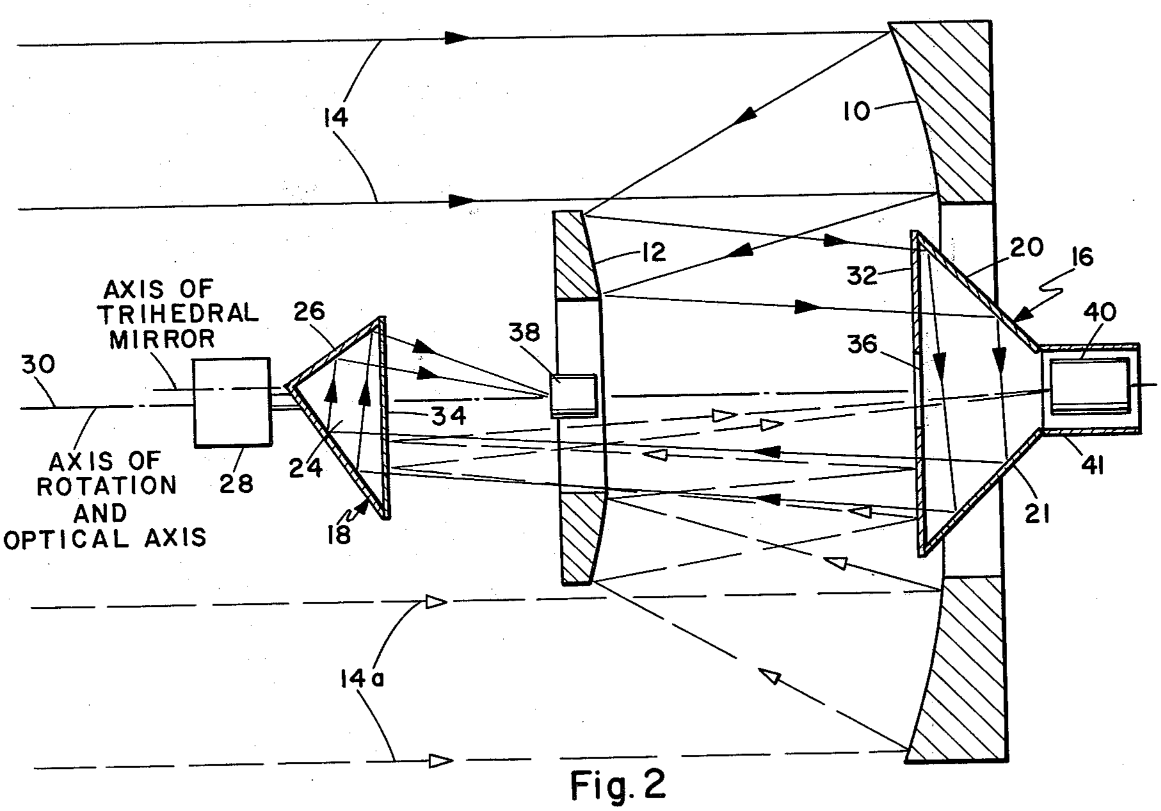
FIG. 2 is a diagram of the optical system with the components in section showing the dual spectral paths and separate detectors.

FIG. 1 illustrates the basic Cassegrainian image forming optical system consisting of primary 10 and secondary 12 reflectors. These reflectors 10 and 12 are assembled in a folded beam configuration which as illustrated in FIG. 2 indicates that the incoming radiation bundle 14 is folded by first being reflected from the primary reflector 10 to the secondary reflector 12 which diverts it toward a dihedral reflector means 16. Other optical elements or lenses may also be present in this system to assist in the image correction process. The dihedral reflector 16 in conjunction with a trihedral reflector 18 additionally fold the ray bundle 14 in the manner hereinafter described.

FIG. 1 illustrates the configurations of the dihedral and trihedral reflectors 16 and 18. The dihedral reflector 16 consists of two plane mirrors 20, 21 which are disposed at an angle of precisely 90° to each other, and this reflector 16 has the well-known property of rotating the image space at an angular rate of twice its own. The trihedral reflector 18 consists of three mutually orthogonal reflective surfaces 22, 24, 26; a configuration which may be obtained by cutting the corner with a plane normal to the diagonal passing through the corner. The trihedral reflector 18 exhibits the properties of acting as a retro reflector, inverting and reverting the image but not rotating it. Both the dihedral and trihedral reflectors 16, 18 are mounted for rotation about the systems principal optical axis, 30. Conventional drive means 28 rotates the trihedral reflector 18, the drive means for the dihedral reflector 16 being a rotating sleeve 41. In FIG. 2, it is seen that the trihedral reflector 18 is assembled slightly offset from the primary optical axis 30 of the system. This produces rotation of the trihedral reflector 18 about the optical axis and causes the image plane to be translated in a circle about the optical axis 30 whose radius equals the offset. The reflectors 16, 18 are then driven at appropriate speeds to generate a rosette scanning motion, with the important advantage that both components thereof are pure translation in the image plane. No tilting of the image plane takes place.

Separation of widely separated spectral components is accomplished by means of dichroic beam splitters 32, 34 which are normal to the optical axis. They may be assembled to the dihedral and trihedral reflectors 16, 18 respectively, as shown, but they may be free standing and stationary. These filters 32, 34 function selectively to avoid the scanning action as well as to change the spacing and path length of the system. Specifically, the ray bundle 14 denoted by the solid line is incident upon the surface 20 of the dihedrol reflector 16 and is diverted toward and strikes the surface 21 of that dihedral reflector. As illustrated in FIG. 2, the ray bundle 14 is permitted to pass through the dichroic filter 32 without any alteration of the beam path. The ray bundle 14*a* denoted by the broken lines however, is reflected by the dichroic filter 32, is further reflected by the dichroic filter 34, and is permitted to pass through a zone of transparency 36 at the center of the dichroic filter 32. The beam bundle 14 is unaffected by the dichroic filters 32, 34 and it is permitted to pass into the trihedral reflector 18. In the trihedral reflector the beam bundle 14 is inverted and reverted and emerges to form an image on the detector 38. The ray bundle 14 represents an infrared bundle and the detector 38 is of conventional construction. The ray bundle 14*a* is visible radiation and the image thereof is formed on a video detector 40 situate behind the dihedral reflector 16. The net effect of the dichroic filters 32, 34 is to short-circuit the scanning process to which the infrared radiation 14 is subjected so that a stationary image of the visual channel is formed on the video detector 40. Because of the shortening of the path length between the reflectors 16, 18, the video detector 40 may be placed behind the dihedral reflector 16 instead of in the vicinity of the infrared detector 38. The configuration of nested reflective components functions without substantial vignetting because the central obscuration of the primary, traced back to the two different image planes, allows the placement of components in mutually noninterfering locations. Therefore, a visual image of high resolution may be obtained at all times while at the same time the infrared radiation 14 may be utilized in a continuous scanning mode.

Modifications and adaptions in the method and materials of fabrication, in the assemblage and configuration of the constituent elements, may be made without departing from the scope of the appended claims, which changes are intended to be embraced therewithin.

Having described my invention, I now claim:

1. In a seeker scanning system of the type comprising: imaging means on a system optical axis, and means for directing an input ray bundle to the imaging means, the imaging means comprises,
dihedral reflector means disposed for rotation about the optical axis and effective to rotate the ray bundle at an angular rate twice its own,
trihedral reflector means disposed for rotation about the optical axis and adapted to intercept the ray bundle rotated by the dihedral reflector means and effective to invert and revert the ray bundle,
means for rotating dihedral and trihedral reflectors about the optical axis, and filter means associated with each of said dihedral and trihedral reflectors for dissociating infrared wavelengths from visable wavelengths of the ray bundle by transmitting the infrared wavelengths and reflecting the visable wavelengths.

2. The seeker scanning system of claim 1 wherein:
said dihedral reflector means comprises two orthogonal plane reflectors.

3. The seeker scanning system of claim 1 wherein:
said trihedral reflector means comprises three mutually orthogonal plane reflectors.

4. The seeker scanning system of claim 1,
the apex of the trihedral reflector means is offset from the optical axis,
and the dihedral and trihedral reflector means are rotated with respect to each other to produce a rosette scanning function.

5. In the seeker scanning system of claim 4,
infrared detector means disposed on the optical axis for receiving the infrared image.

6. In the seeker scanning system of claim 4,
said filter means associated with said dihedral reflector means includes a zone of transparency to pass the visible wavelengths therethrough.

7. In the seeker scanning system of claim 6,
video detection means disposed on the optical axis, behind said dihedral reflector means and adapted for receiving the visible image passing through said zone.

8. In the seeker scanning system of the type comprising:
imaging means on a system optical axis,
means for directing an input ray bundle to the imaging means,
the imaging means comprises dihedral reflector means disposed for rotating an image at an angular rate twice its own, said dihedral reflector means comprising two orthogonal reflectors, trihedral reflector means disposed for rotation about the optical axis and adapted to intercept the ray bundle rotated by said dihedral reflector means and to invert and revert the ray bundle, said trihedral reflector means comprising three mutually orthogonal reflectors, the mutual intersection point of which is offset from the optical axis, means for rotating said dihedral and trihedral reflector means with respect to each other to produce a rosette scanning function, and filter means associated with each of said dihedral and trihedral reflector means, said filter means adapted for disassociating infrared wavelengths from visible wavelengths of the ray bundle by transmitting the infrared wavelengths and reflecting the visible wavelengths, thereby to form the infrared and visible images at different stations along the optical axis.

* * * * *